Nov. 2, 1965 A. O. ROBERTS 3,215,113
PASSENGER VEHICLE HAVING PNEUMATIC BODY AND FRAME
Filed May 2, 1963 5 Sheets-Sheet 1
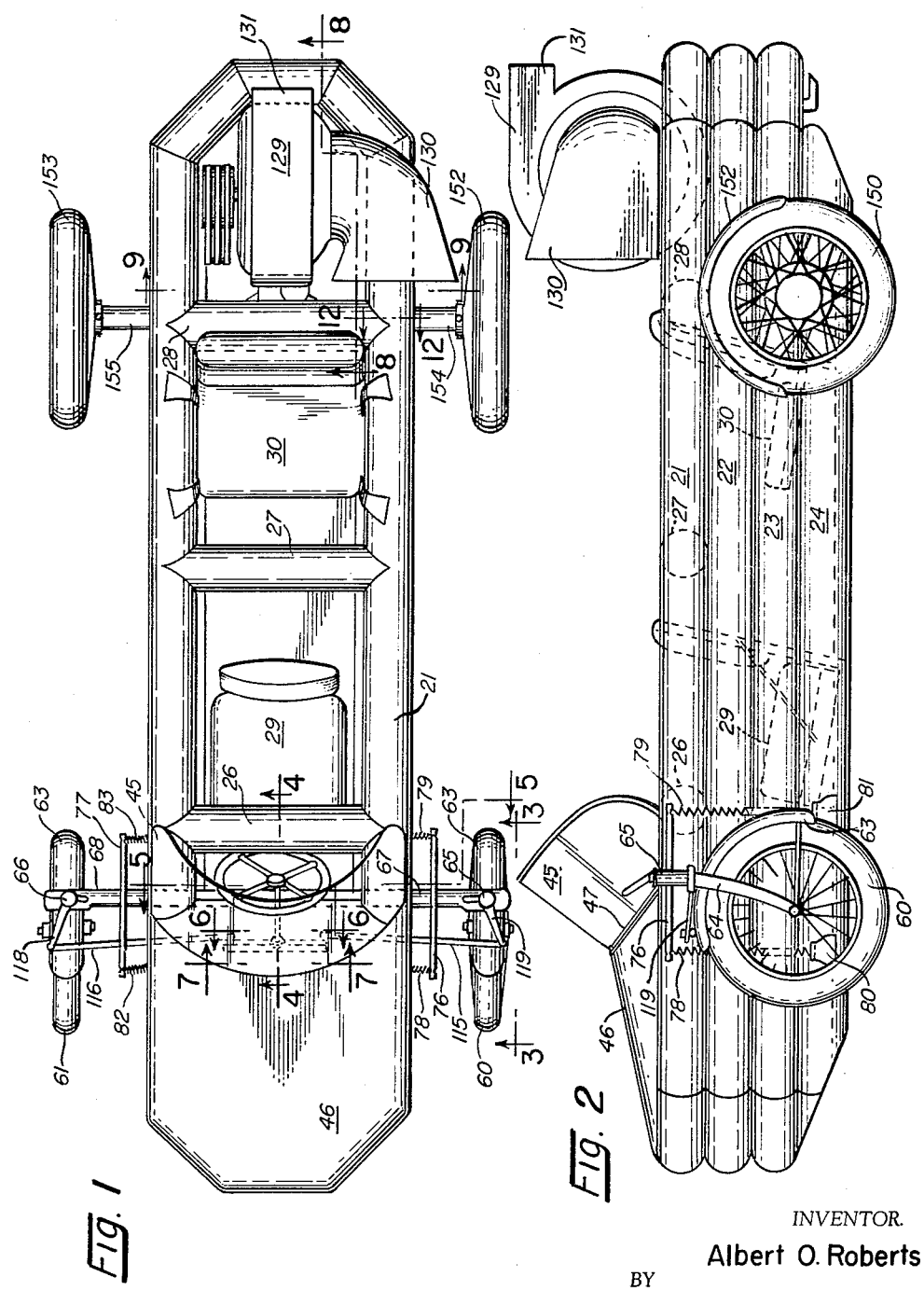
INVENTOR.
Albert O. Roberts
BY
B. B. Olive
ATTORNEY

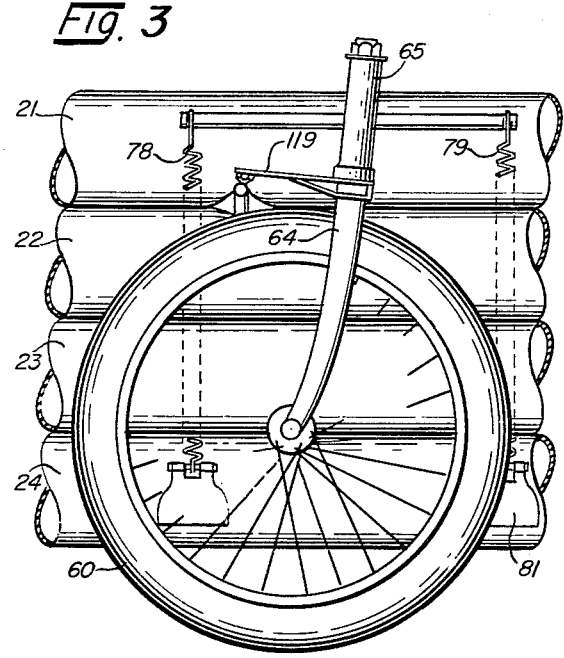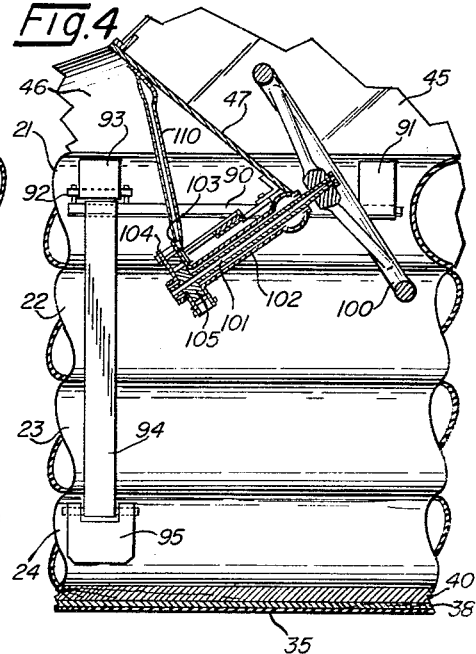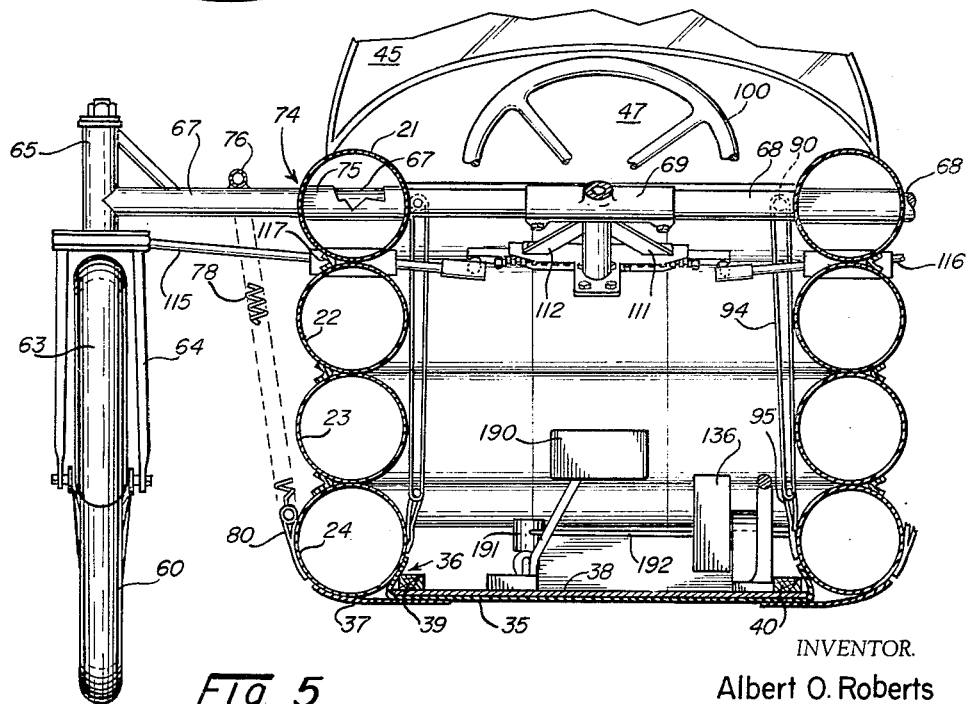

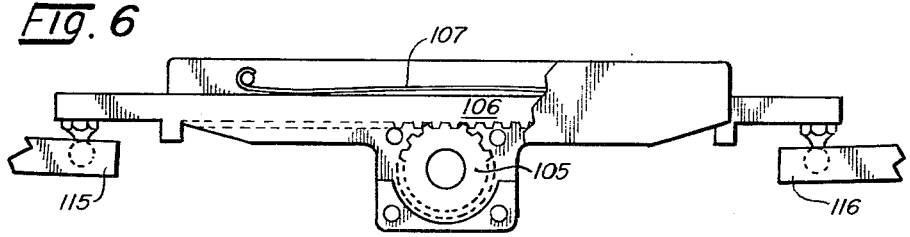
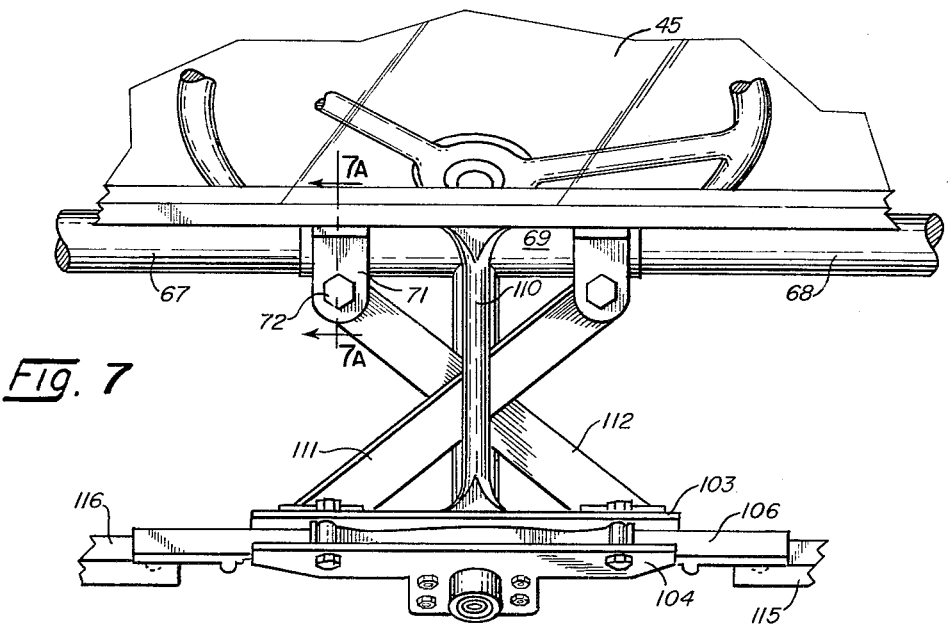
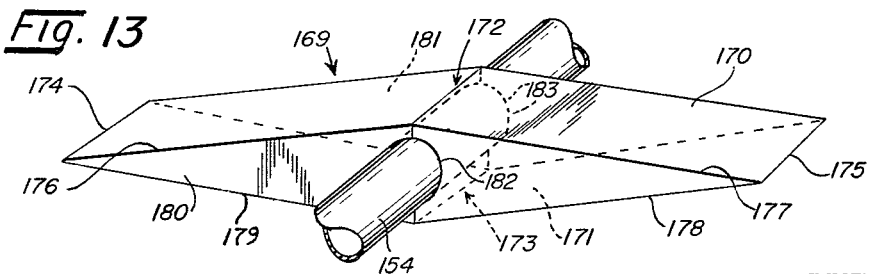

Nov. 2, 1965 A. O. ROBERTS 3,215,113
PASSENGER VEHICLE HAVING PNEUMATIC BODY AND FRAME
Filed May 2, 1963 5 Sheets-Sheet 4
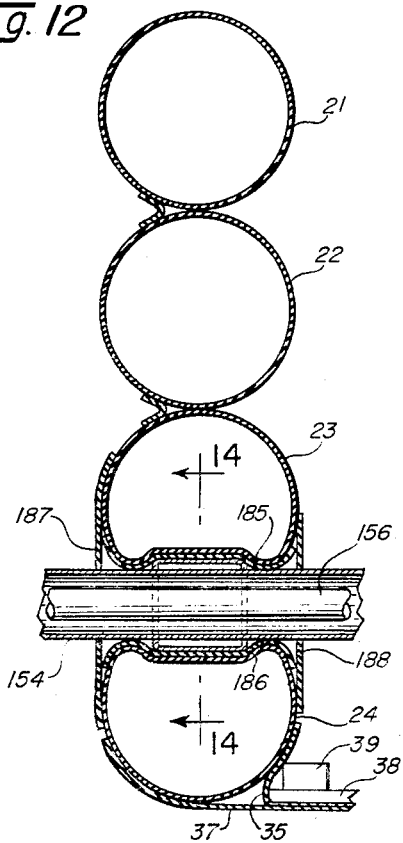
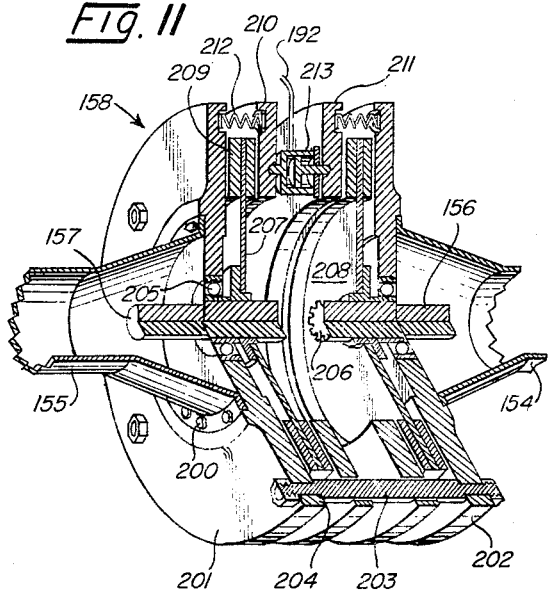
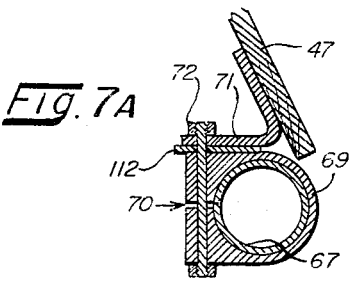
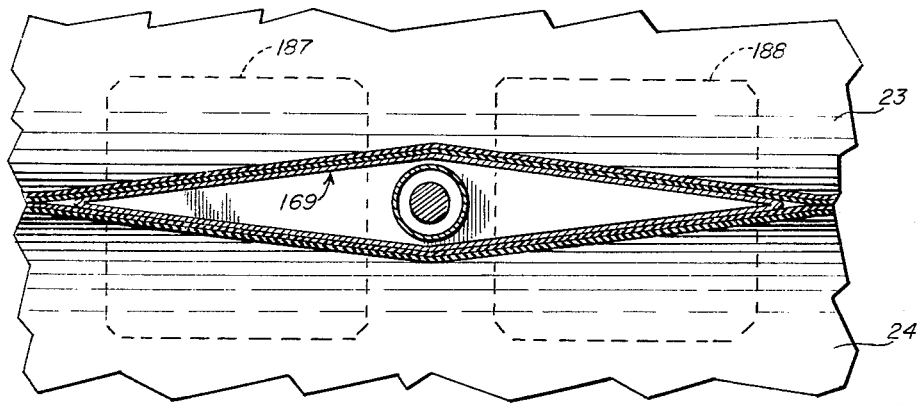
INVENTOR.
Albert O. Roberts
BY
*B. B. Olive*
ATTORNEY Nov. 2, 1965  A. O. ROBERTS  3,215,113
PASSENGER VEHICLE HAVING PNEUMATIC BODY AND FRAME
Filed May 2, 1963  5 Sheets-Sheet 5
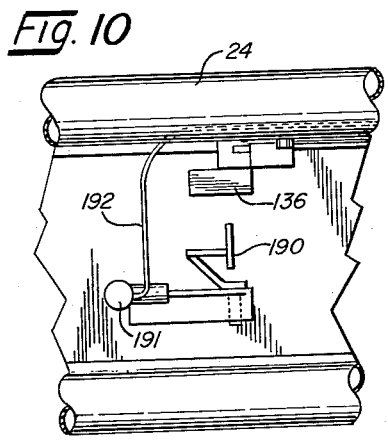
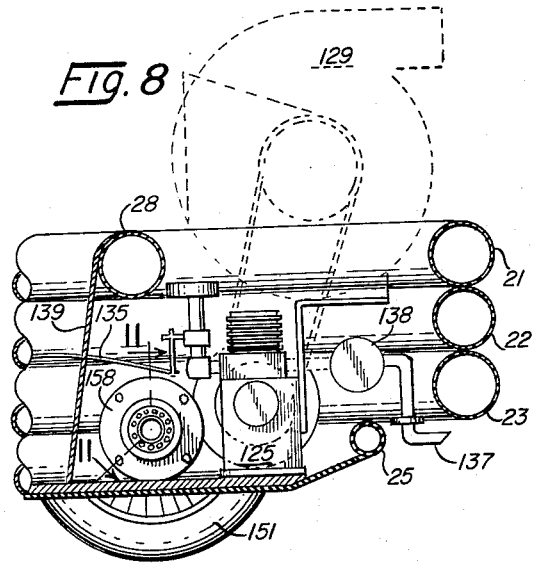
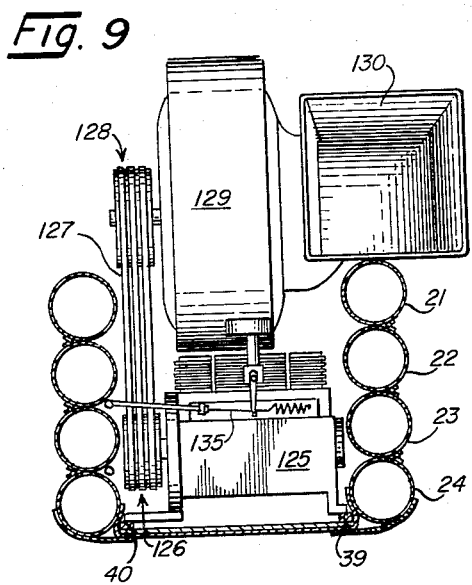
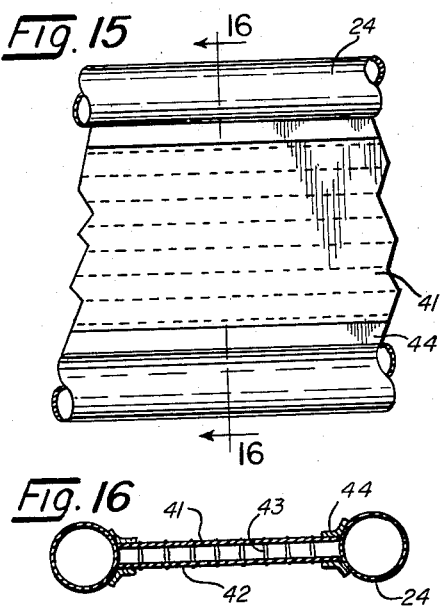
INVENTOR.
Albert O. Roberts
BY
B. B. Olin
ATTORNEY United States Patent Office 3,215,113
Patented Nov. 2, 1965

3,215,113
PASSENGER VEHICLE HAVING PNEUMATIC
BODY AND FRAME
Albert O. Roberts, Rte. 2, Box 163, Durham, N.C.
Filed May 2, 1963, Ser. No. 277,525
14 Claims. (Cl. 115—1)

This invention is concerned with a vehicle having what would normally constitute the body and frame constructed of inflatable members such that the strength and form of such body and frame depend on inflation of these members.

Self propelled passenger carrying land vehicle body and frame structures have almost universally since the earliest such vehicle consisted of substantially rigid but thin metal bodies mounted on rigid metal frames. While such a structural arrangement offers many advantages it is also known that inherent disadvantages are present. Particularly in connection with passenger protection much injury and loss of life appear to be attributable to the fact that much of a collision force dissipates itself in bending, twisting and tearing apart the modern vehicle body structure. The conventional body and frame structure inherently leads to substantial weight, a need for complex springing and shock absorbing devices and requires substantial horsepower for propulsion. Repair of the conventional body and frame structure is necessarily expensive and life of the structure is shortened by the tendency to rust. It is also pertinent to note the inability of most such structures to float. Aside from what we might term these physical disadvantages another important aspect of building vehicle body and frame structures along conventional lines is the fact that enormous quanities of mineral resources are consumed.

With the above in mind, the object of this invention is to provide a vehicle construction which overcomes many of the mentioned and other disadvantages of conventional construction.

This and other objects of the invention will become apparent from the description which follows when taken with the drawings wherein:

FIGURE 1 is a plan view of a vehicle embodying the invention.

FIGURE 2 is an elevation view of the vehicle.

FIGURE 3 is a fragmentary elevation view taken in the direction of line 3—3 of FIGURE 1, the fender being removed for purpose of illustration.

FIGURE 4 is a fragmentary elevation section view taken along line 4—4 of FIGURE 1.

FIGURE 5 is a fragmentary elevation section view taken along line 5—5 of FIGURE 1.

FIGURE 6 is a fragmentary elevation section view taken along line 6—6 of FIGURE 1.

FIGURE 7 is a fragmentary elevation section view taken along line 7—7 of FIGURE 1.

FIGURE 7A is a fragmentary elevation section view taken along line 7A—7A of FIGURE 7.

FIGURE 8 is a fragmentary elevation section view taken line 8—8 of FIGURE 1 and with certain parts shown in dotted lines.

FIGURE 9 is a fragmentary elevation section view taken along line 9—9 of FIGURE 1.

FIGURE 10 is a fragmentary plan view showing the front portion of the floor as if taken from a position just above the floor in FIGURE 5.

FIGURE 11 is a perspective section view of the rear axle braking mechanism taken generally in the direction of the line 11—11 of FIGURE 8.

FIGURE 12 is a fragmentary elevation view taken along line 12—12 of FIGURE 1.

FIGURE 13 is a perspective view of a rear axle mounting member.

FIGURE 14 is a fragmentary elevation view taken along line 14—14 of FIGURE 12.

FIGURE 15 is a fragmentary plan view showing an alternate form of floor for the vehicle.

FIGURE 16 is an elevation cross section taken on line 16—16 of FIGURE 15.

Prior to proceeding to the description in detail, it is noted that the vehicle of the invention completely dispenses with the rigid body and rigid chassis frame of the conventional vehicle. The vehicle of the invention furthermore provides a vehicle in which the average total passenger weight is apt to be substantially greater than the overall weight of the vehicle. While some metal parts are necessarily employed in the steering, braking, engine and axle mechanisms, the vehicle of the invention completely eliminates the need for metal in those vehicle components customarily thought of as comprising the body, frame and chassis. As will be seen from the description to follow, the principal concept of the invention is based on employing tubular, circumferentially disposed, inflated members in place of the conventional body, frame and chassis. Such tubular members are uniquely employed in the vehicle of the invention as the "beams" between the front and rear axles and also as a means for cushioning shock transmitted to the vehicle body. The tubular members are preferably formed of coated fabric which makes them substantially unstretchable but flexible while retaining a high degree of dimensional stability. A more detailed description now follows.

*Body construction*

As illustrated by the drawings, the body of the vehicle of the invention includes a plurality of inflated circumferential coated fabric tubes closed upon themselves and superimposed one upon the other as represented by the numerals 21, 22, 23, 24. Tubes 21, 22 and 23 are substantially identical in size. Tube 24 is made shorter in length and at each end is reduced in diameter as indicated at 25, FIGURE 8, in order to obtain the streamlining taper effect on the ends of the bottom surface as best seen at the ends of tube 24 in FIGURE 2. As indicative of one form of the invention, six inch diameter tubes under four pounds pressure and with the front and rear axles spaced about six and one-half feet apart have been found capable of furnishing enough beam strength to support two adult passengers of approximately two hundred pounds weight each.

Cross bracing of the body is achieved by the laterally placed inflated tubes 26, 27, 28 each of which is preferably arranged in air connection with tube 21 so as to be inflatable with tube 21. A pair of seats 29, 30 are located one behind the other and within the confines of the body formed by tubes 21, 22, 23 and 24. Of particular significance from a safety viewpoint is the fact that lateral bracing tube 26 serves in effect as a safety belt for the passenger sitting in seat 29 whereas lateral bracing tube 27 serves in effect as a safety belt for the passenger sitting in seat 30. For a two-passenger vehicle such an arrangement of seats one behind the other also leads to a much narrower width vehicle than customarily found in the passenger vehicle art.

It should be particularly noted that the "beam strength" conventionally found in rigid metal body frame and chassis frame members of conventional vehicles is found in the present vehicle body in the inflated tube members 21, 22, 23 and 24. That is, an inflated tubular body of the type being described when suspended by and between transverse front and rear axles is found to be entirely capable of supporting substantial passenger loads between the two axles.

Because of the beam strength found in the flexible tubes 21, 22, 23 and 24, a satisfactory body floor is provided by a fabric sheet 35 which extends over the bottom of the vehicle body and is suspended by its edges from the lower tube 24 to which the edges are secured as shown at 36, FIGURE 5. Sheet 35 is in turn reinforced by means of suitable longitudinally placed strips 37, FIGURE 5, which extend the length of tube 24 and which are affixed both to sheet 35 and to the bottom of tube 24. Resting on sheet 35 is a thin plate member 38, thin plywood being suitable, which forms the floor proper and resting on plate member 38 at each edge are a pair of stringers 39, 40 which may be wood strips or the like and which have been found useful in adjustably mounting the front seat 29 and also as a means for supporting the drive engine later referred to.

As mentioned above, the floor of the vehicle is suspended from and supported by tube 24 and comprises in one form the fabric sheet 35 and the plate member 38. An alternative form of floor is illustrated by FIGURES 15 and 16 in which use is made of an inflated two ply mattress type fabric comprising a first fabric ply 41 and a second fabric ply 42 interconnected by a multiplicity of spaced tie threads 43 of predetermined equal length. Reinforcing tape 44 is employed to secure the fabric to tube 24 and the mattress may be placed in air communication with tube 24 by a suitable channel, not shown, or it may be separately inflated. Such a panel when inflated gives an extremely rigid structure, ideally suited to the purposes of the invention but because of its susceptibility to scuffing and wear should preferably be employed with stringers for engine and seat support such as the previously mentioned stringers 39 and 40 and should also preferably be covered with lightweight carpeting or the like.

A suitable windshield 45 is secured to the top of tube 21 and is connected at its bottom edge to a canopy 46 that is secured to the top front portion of tube 21 and furnishes a cover for the front of the body. Windshield 45 and canopy 46 are both further secured to the outer edge of a panel 47 suitable for mounting speed indicating, engine and similar instruments, not shown.

*Steering and front suspension*

The front of the vehicle is supported by a pair of conventional spoke type wheels 60, 61 mounted under fenders 62, 63 and in conventional forks 64. The forks 64 are mounted in fork hubs 65, 66 and are adapted to be rotated around the vertical axis of these hubs in the conventional manner. The hubs 65, 66 are integrally fixed by welding or other suitable means to respective horizontally disposed tubes 67, 68 the free ends of which are mounted within a further fixed tube 69 (FIGURES 5 and 7). As best illustrated by FIGURE 7A, tube 69 is split as at 70 and on tube 69 there are mounted suitable split clamps 71 which are tightened by bolts 72. In use, tubes 67, 68 are adjusted so as to place the axis of hubs 65, 66 at the correct, vertical angle after which clamps 71 are securely tightened.

Referring further to tubes 67, 68, it will be noted in FIGURE 5 that each of these tubes passes through the side of tube 21 as at 74 by being mounted within short rigid pipe sections 75 which in turn are sealed on to tube 21. It is desirable however, that the full front weight of the vehicle be supported from the tube members 67, 68 and that essentially no weight be placed on tube 21 particularly where the tube members 67, 68 go through tube 21 as at 74. In this regard, there is provided a rigid horizontal bar 76 fixedly secured by welding or the like to tube 67 and a similar bar 77 secured to tube 68. The ends of bar 76 support the ends of a pair of coil springs 78, 79 whose other ends are secured respectively to a suitable pair of flexible connection flaps 80, 81 which in turn are fixed to the bottom outer surface of tube 24. In a similar manner, bar 77 supports a similar pair of springs 82, 83 which are similarly secured by connection flaps, not shown, on the opposite bottom outer surface of tube 24. Through the springing system described, it can be seen that both the inherent cushioning effect of the pneumatic tubes and the mentioned coil springs are utilized to absorb shock between the seats 29, 30 and the front wheels 60, 61.

Particularly during braking there is a need for a compensating torque. The system employed on both front sides is illustrated by FIGURES 4 and 5, the explanation being made with regard to only one side of the body. A rigid rod 90 of reduced size passes through tube 68 and is secured to tube 68 by welding or the like. Any torque on tube 68 is thus transmitted to rod 90. One end of rod 90 is somewhat loosely supported in a hanger flap 91 secured to the inside of tube 21. The other end of rod 90 is secured to a suitable hanger 92 which in turn is held in a similar hanger flap 93. An elastic member 94, preferably in the form of a wide rubber band, is looped at one end over rod 90 and on the other end is fastened to a suitable hanger flap 95 that is secured to the inside bottom surface of tube 24. Looking towards FIGURE 4, it can be seen from the arrangement described that clockwise torque on tube 68 will be opposed by the action of band 94 and the pull of hanger strap 91 pulling on tube 21 whereas counterclockwise torque will be opposed primarily by the action of hanger strap 93 pulling on tube 21.

Steering of the vehicle is achieved by turning wheels 60, 61 which in turn is effected through action of the steering wheel 100 and the wheels. Such linkage includes a steering wheel shaft 101 mounted in a steering wheel column 102. Column 102 in turn mounts a pair of plates 103, 104 between which is mounted a pinion gear 105 and rack gear 106. Pinion gear 105 is fixed to shaft 101 such that when steering wheel 100 is rotated, rack gear 106 is moved in one direction or the other. To insure a tight mesh between the two gears as wheel 100 turns, a leaf spring 107 is mounted between plates 103, 104 and is adapted to engage rack gear 106 and constantly urge it towards pinion gear 105. Bracing is provided by the brace members 110, 111 and 112.

Pivotally connected to the opposite ends of rack gear 106, preferably by ball and socket type connections are a pair of drag links 115, 116. Drag links 115, 116 are mounted so as to pass between tubes 21 and 22 and to facilitate free movement a hollow tube such as indicated at 117, FIGURE 5, is mounted between tubes 21 and 22 so as to surround the respective drag link and provide a free path at the point of passage of the link between the tubes. Links 115, 116 are further pivotally connected respectively to steering arms 118, 119 which are rigidly secured to the fork members 64 that mount wheels 60 and 61. Thus, steering wheel 100 may be rotated and thereby move wheels 60 and 61 so as to direct the vehicle in the desired direction.

*Vehicle propulsion*

Propulsion of the vehicle may be by any means conventional to passenger vehicles. A system which offers many advantages for a light weight vehicle of the nature of this invention is found in an internal combustion engine driven air intake and exhaust blower. As illustrated, 125 represents an internal combustion engine having a set of drive pulleys 126 arranged to drive through a belt set 127 a set of mating pulleys 128 that are connected to drive a blower 129. Blower 129 has its funnel type intake duct 130 positioned so as to face towards the front of the vehicle and its funnel type exhaust duct 131 directed rearwardly of the vehicle. The engine 125 is mounted on the previously mentioned stringers 39, 40, FIGURE 9, and has connected to it the usual carburetor control wire 135 which extends to a control foot pedal 136, FIGURES 5 and 10, the portion of wire 135 between the engine 125 and pedal 136 not being shown. Engine exhaust is ducted through an exhaust pipe 137 which leads from a suitable muffler 138. The heat of the engine is confined to the rear of the vehicle by a suitable heat barrier wall 139, FIGURE 8, formed of asbestos or the like and which is secured between the lateral tube 28 and the floor plate 38.

From the description then, it will be appreciated that by selecting a suitably sized engine and blower a very substantial forward thrust can be achieved which, due to the extremely lightweight body will give effective propulsion on the road or on water or on ice, it being contemplated that short reverse motions when needed will be accomplished manually and with ease because of the body's lightweight.

Propulsion by means of a blower is shown on the drawings because this is the simplest means for an amphibious vehicle. However, this vehicle is readily adaptable for a more conventional drive. With the engine in the rear, a commercial differential and automatic transmission could be used to drive the rear axle. In this case, propulsion in the water would be by means of paddle wheels attached to the rear wheels or centrifugal pumps ejecting water to the rear.

*Rear suspension and brake*

The rear of the vehicle is supported by a pair of spoked wheels 150, 151 covered by suitable fenders 152, 153, bracketed or otherwise secured to the respective axle housings 154, 155. The wheel and its outer hub and bearing race may be conventional and is therefore not shown in detail. The wheels run freely of each other and are secured to respective axles 156, 157 terminating in the disc braking mechanism to be explained.

The respective rear axle housings pass into the body between tubes 23 and 24 as shown in FIGURE 12. Springing and torque distribution of the rear axles are obtained by securing to each axle housing the hollow double wedged structure 169 shown in FIGURE 13. The structure is formed by a pair of oppositely disposed rectangular metal plate members 170, 171 bent towards each other in the middle as at 172, 173. The plate members 170, 171 are welded together at the ends 174, 175 and are further welded along the remaining edges such as indicated at 176, 177, 178, 179 to a pair of oppositely disposed diamond shaped metal plate members 180, 181. Each of the diamond shaped plate members 180, 181 are provided with opposing holes 182, 183 which receive the respective axle housing such as housing 154. After the housings have been placed in these holes they are then preferably welded around the juncture edges of the holes and housings so as to make integral each respective housing and structure 169.

Prior to placing the structures 169 in the vehicle, suitable fabric flaps as indicated at 185, 186, FIGURE 12, are glued or otherwise secured to the members 170, 171 and are similarly secured to tubes 23, 24 also shown in FIGURE 12. As further reinforcement around the axle housing additional fabric plates such as at 187, 188 are employed as needed.

Braking is achieved by a hydraulic disc type system mounted completely within the body. As indicated in FIGURES 5 and 10, braking is effected by a conventional hydraulic brake pedal 190 which forces suitable fluid from a master cylinder 191 into a brake line 192 which leads to the braking mechanism 158 now to be referred to in connection with FIGURE 11.

As shown in FIGURE 11, the respective axle housings 154, 155 are bolted by suitable bolts 200 to a pair of fixed discs 201, 202 such that any torque applied to discs 201, 202 will be transmitted to the axle housings 154, 155 and ultimately to the torque and springing devices 169. Discs 201 and 202 mount on bolts 203 having shoulders as at 204 such that discs 201, 202 are kept at a fixed spaced position. Each of discs 201, 202 mounts a suitable bearing as at 205 in which the respective axles 156, 157 are rotatably positioned.

The ends of axles 156, 157 are each splined as at 206 and on the respective splines are slidably mounted brake discs 207, 208. Each brake disc has disposed at its outer periphery and on each side, bands of brake lining as indicated at 209. Between the brake discs 207, 208 and slidably mounted on bolts 203 are a further pair of braking discs 210, 211. A suitable number of compression springs such as at 212 tend to force braking discs 210, 211 inwardly and free of brake discs 207, 208. Thus, as long as springs 212 are free to act, brake discs 207, 208 rotate freely with axles 156, 157 and no braking effort is applied to the vehicle. Mounted between braking discs 210, 211 are a suitable number of brake cylinders such as the cylinder 213. Each of the cylinders 213 are connected to the hydraulic line 192 such that when pressure is applied to the brake foot pedal 190, a corresponding pressure acts on braking discs 210, 211 and tends to force them to slide on bolts 203 so as to bring the brake linings in contact with the mating surfaces of the fixed discs 201, 202 and braking discs 210, 211. By applying sufficient pressure with the brake foot pedal 190 it will be readily seen that the respective axles can, in effect, be locked to the respective housings and thereby bring the vehicle to an immediate stop. During the braking operation, it will also be appreciated that the torque which is applied to the respective axle housings is also applied to the structures 169 fixed to the housings and is counteracted by the effect of tubes 23, 24 on the structures 169 as the structures try to rotate under the influence of the torque.

While not shown, it will be appreciated that the vehicle of the invention may be, if desired, equipped with conventional starting, windshield wiping, lights, horn and similar auxiliary equipment.

Having described my invention, I claim:

1. In a passenger carrying vehicle, a light weight resilient bouyant body the major portion of which comprises a flexible circumferentially disposed endless inflated wall effective to form passenger seating and other compartments; a front axle bar passing transversely through the top of said wall near the front of said vehicle; wheel forks rotatably mounted at opposite ends of said front axle bar; wheels rotatably mounted in each of said forks; a steering linkage connected to said forks and including a steering wheel mounted within said passenger seating compartment enabling said vehicle to be steered; elastic means supported from said front axle bar and connected to the bottom of said wall on each side of said body whereby to elastically support said wall from said front axle bar and utilize said wall as a front axle shock and torque absorbing means; a rear axle assembly including rear wheels at opposite ends thereof and an axle housing passing transversely through the bottom of said wall near the rear of said vehicle, said housing including on each side of said body integral horizontally disposed arm members secured to said wall and extending forwardly and rearwardly of said housing where it passes through said wall, said arm members being adapted to support and utilize said wall as a rear axle shock and torque absorbing means; a relatively rigid floor member secured at its outer margin to and suspended from the bottom of said wall; and propulsion means mounted within said body and effective to make said vehicle self-propelling.

2. In a passenger carrying vehicle as claimed in claim 1 in which said propulsion means comprises an air moving device.

3. In passenger carrying vehicle as claimed in claim 1 in which said rigid floor member comprises an inflated mattress type panel.

4. In a passenger carrying vehicle as claimed in claim 1 including transverse tubular members rigidly connected to said wall and placed to effectively serve the restraint purpose of passenger safety belts.

5. In a passenger carrying vehicle as claimed in claim 1 in which said passenger seating compartment is formed to receive two passenger seats one behind the other.

6. In a passenger carrying vehicle as claimed in claim 1 in which said wall comprises a plurality of inflated vertically stacked fixedly mounted interconnected flexible-walled circumferentially disposed endless tube members.

7. In a passenger carrying vehicle, a light weight resilient bouyant body the major portion of which comprises a flexible circumferentially disposed inflated endless wall effective to form passenger seating and other compartments; a front axle bar mounted transverse of said wall at the front of said vehicle; front wheels rotatably mounted at opposite ends of said front axle bar; horizontally disposed rod-like arm members integrally secured to said bar on each side of said body and extending forwardly and rearwardly of said front axle bar; elastic means connected between the ends of said arm members and the bottom of said wall on each side of said body whereby to elastically support said wall from said front axle bar and utilize said wall as a front axle shock and torque absorbing means; a rear axle assembly including a housing passing transversely through said wall near the rear of said vehicle and at the bottom of said wall, said housing including on each side of said body where said housing passes through said wall box-like structures secured to the wall and having horizontally disposed tapered ends extending forwardly and rearwardly of said housing, said structures being adapted to support and utilize said wall as a rear axle shock and torque absorbing means; a steering linkage including a steering wheel mounted in said body and effective to position said front wheels; a relatively rigid floor member secured at its outer margins to and suspended from the bottom of said wall; rear wheel means mounted at opposite ends of said rear axle assembly; and propulsion means mounted within said body and effective to make said vehicle self-propelling.

8. In a passenger carrying vehicle as claimed in claim 7 in which said wall comprises a plurality of inflated vertically stacked fixedly mounted interconnected flexible-walled circumferentially disposed endless tubular members.

9. In a passenger carrying vehicle as claimed in claim 7 in which said propulsion means comprises an air moving device.

10. In a passenger carrying self propelled vehicle, a composite body and frame comprising a plurality of vertically stacked circumferentially disposed endless tubular members, said members being secured together and being inflated to a predetermined pressure effective to form said members as a substantially rigid buoyant structure including passenger seating and other weight bearing compartments; a floor member secured to the bottom of said stacked members; front and rear axles; said members providing substantially the sole structural connection between said axles; wheels secured to said axles; means mounting said axles on the composite body and frame formed by said members, said mounting means being arranged to utilize the resiliency of said composite body and frame both to provide normal springing action for shocks encountered by said wheels and during braking and acceleration to absorb torque effects placed on said axles; means mounted in said body and frame for steering the wheels mounted on said front axle; and means mounted in said body and frame for propelling said vehicle.

11. In a passenger carrying self propelled vehicle as claimed in claim 10 having a relatively rigid inflated floor member of the mattress panel type secured at its outer margin to and suspended from the bottom of said wall.

12. In a passenger carrying vehicle, a light weight resilient buoyant body the major portion of which comprises a flexible circumferentially disposed endless inflated wall effective to form passenger seating and other compartments; a front axle bar positioned transversely of said wall near the top and front of said vehicle and acting to suspend said wall; wheels rotatably mounted at opposite ends of said front axle bar; a steering linkage connected to said wheels and including a steering wheel mounted within said passenger seating compartment enabling said vehicle to be steered; elastic means supported from said front axle bar and connected to the bottom of said wall on each side of said body whereby to elastically support said wall from said front axle bar and utilize said wall as a front axle shock and torque absorbing means; a rear axle assembly including rear wheels at opposite ends thereof being positioned transversely of said wall and adapted to support and utilize said wall as a rear axle shock and torque absorbing means; a relatively rigid floor member secured at its outer margin to and suspended from the bottom of said wall; and propulsion means mounted within said body and effective to make said vehicle self propelling.

13. In a passenger carrying vehicle as claimed in claim 12 including brake means mounted within said body with said assembly and effective to apply a braking action to said rear axle wheels from within said body thereby avoiding exposure of said brake means to outside water.

14. In a passenger carrying vehicle, a light weight resilient buoyant body the major portion of which comprises a flexible circumferentially disposed endless inflated wall effective to form passenger seating and other compartments; a front axle bar positioned transversely of said wall near the top and front of said vehicle and acting to suspend said wall; wheels rotatably mounted at opposite ends of said front axle bar; a steering linkage connected to said wheels and including a steering wheel mounted within said passenger seating compartment enabling said vehicle to be steered; elastic means supported from said front axle bar and connected to the bottom of said wall on each side of said body whereby to elastically support said wall from said front axle bar and utilize said wall as a front axle shock and torque absorbing means; a rear axle assembly including rear wheels at opposite ends thereof and an axle housing passing transversely through the bottom of said wall near the rear of said vehicle, said housing including on each side of said body integral horizontally disposed arm members secured to said wall and extending forwardly and rearwardly of said housing where it passes through said wall, said arm members being positioned transversely of said wall and adapted to support and utilize said wall as a rear axle shock and torque absorbing means; a relatively rigid floor member secured at its outer margin to and suspended from the bottom of said wall; and propulsion means mounted within said body and effective to make said vehicle self propelling.

References Cited by the Examiner

UNITED STATES PATENTS

| 1,372,528 | 3/21 | Marcovsky | 9—2 |
| 1,450,197 | 4/23 | Zwickey | 115—1 |
| 2,962,732 | 12/60 | Marz | 9—2 |

FOREIGN PATENTS

| 597,390 | 5/60 | Canada. |
| 966,587 | 9/57 | Germany. |

MILTON BUCHLER, *Primary Examiner.*

ANDREW H. FARRELL, *Examiner.*